United States Patent
Menon et al.

(10) Patent No.: US 6,940,917 B2
(45) Date of Patent: Sep. 6, 2005

(54) BEAM-STEERING AND BEAM-FORMING FOR WIDEBAND MIMO/MISO SYSTEMS

(75) Inventors: Murali Paravath Menon, Waltham, MA (US); John W. Ketchum, Harvard, MA (US); Mark Wallace, Bedford, MA (US); Jay Rod Walton, Carlisle, MA (US); Steven J. Howard, Harvard, MA (US)

(73) Assignee: Qualcomm, Incorporated, San Diego, CA (US)

( * ) Notice: Subject to any disclaimer, the term of this patent is extended or adjusted under 35 U.S.C. 154(b) by 149 days.

(21) Appl. No.: 10/228,393

(22) Filed: Aug. 27, 2002

(65) Prior Publication Data

US 2004/0042439 A1 Mar. 4, 2004

(51) Int. Cl.[7] ................................. H04B 7/02
(52) U.S. Cl. ....................................... 375/267
(58) Field of Search ............................... 375/295, 296, 375/144, 260, 267, 298, 299

(56) References Cited

U.S. PATENT DOCUMENTS 6,377,631 B1    4/2002   Raleigh
6,473,467 B1 *  10/2002  Wallace et al. ............. 375/267
2002/0154705 A1 * 10/2002  Walton et al. .............. 375/267
2003/0108117 A1 *  6/2003  Ketchum et al. ........... 375/295

FOREIGN PATENT DOCUMENTS

WO         02/05506 A2    1/2002

* cited by examiner

Primary Examiner—Don N. Vo
(74) Attorney, Agent, or Firm—Dmitry Milikovsky; Micky Minhas; Phillip Wadsworth

(57) ABSTRACT

Techniques to perform beam-steering and beam-forming to transmit data on a single eigenmode in a wideband multiple-input channel. In one method, a steering vector is obtained for each of a number of subbands. Depending on how the steering vectors are defined, beam-steering or beam-forming can be achieved for each subband. The total transmit power is allocated to the subbands based on a particular power allocation scheme (e.g., full channel inversion, selective channel inversion, water-filling, or uniform). A scaling value is then obtained for each subband based on its allocated transmit power. Data to be transmitted is coded and modulated to provide modulation symbols. The modulation symbols to be transmitted on each subband are scaled with the subband's scaling value and further preconditioned with the subband's steering vector. A stream of preconditioned symbols is then formed for each transmit antenna.

27 Claims, 5 Drawing Sheets

BEAM-STEERING AND BEAM-FORMING FOR WIDEBAND MIMO/MISO SYSTEMS

BACKGROUND

1. Field

The present invention relates generally to data communication, and more specifically to techniques for performing beam-steering and beam-forming for wideband MIMO/MISO systems.

2. Background

A multiple-input multiple-output (MIMO) communication system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S \leq \min\{N_T, N_R\}$. Each of the $N_S$ independent channels is also referred to as a spatial subchannel or eigenmode of the MIMO channel.

A multiple-input single-output (MISO) communication system employs multiple ($N_T$) transmit antennas and a single receive antenna for data transmission. A MISO channel formed by the $N_T$ transmit and single receive antenna includes a single spatial subchannel or eigenmode. However, the multiple transmit antennas may be used to provide transmit diversity or to perform beam-forming or beam-steering for the data transmission.

For a wideband system, orthogonal frequency division multiplexing (OFDM) may be used to effectively partition the overall system bandwidth into a number of ($N_F$) orthogonal subbands, which are also referred to as frequency bins or subchannels. With OFDM, each subband is associated with a respective subcarrier upon which data may be modulated. For a MIMO/MISO system that utilizes OFDM (i.e., a MIMO/MISO-OFDM system), each subband of each spatial subchannel may be viewed as an independent transmission channel.

The spatial subchannel(s) of a wideband MIMO/MISO system may encounter different channel conditions due to various factors such as fading and multipath. Each spatial subchannel may experience frequency selective fading, which is characterized by different channel gains at different frequencies of the overall system bandwidth. This may then result in different signal-to-noise ratios (SNRs) at different frequencies of each spatial subchannel. Moreover, the channel conditions may deteriorate to a level where most of the spatial subchannels are highly degraded. In these situations, improved performance may be achieved by using only the best spatial subchannel for data transmission.

There is therefore a need in the art for techniques to process data for transmission on a single spatial subchannel when warranted by the channel conditions.

SUMMARY

Techniques are provided herein to transmit data on a single spatial subchannel (or eigenmode) in a wideband multiple-input system, which may be a MIMO or MISO system (e.g., a MIMO-OFDM or MISO-OFDM system). These techniques may be used to provide improved performance under adverse channel conditions.

Data transmission on a single eigenmode (typically the best or principal eigenmode for a MIMO system) may be achieved using beam-steering or beam-forming. For a wideband MIMO/MISO system, the beam-steering or beam-forming is performed for each subband that is selected for use for data transmission based on a steering vector obtained for that subband. The beam-steering or beam-forming may also be performed in conjunction with a particular power allocation scheme that allocates the total transmit power to the subbands.

In an embodiment, a method is provided to process data for transmission via a single eigenmode of a multiple-input channel (e.g., a MIMO or MISO channel). In accordance with the method, a steering vector is obtained for each of a number of subbands. Each steering vector includes $N_T$ elements for $N_T$ transmit antennas. Depending on how the steering vectors are defined, beam-steering or beam-forming can be achieved for each subband.

The total transmit power is allocated to the subbands based on a particular power allocation scheme (e.g., full channel inversion, selective channel inversion, water-filling, or uniform, all of which are described below). A scaling value is then obtained for each subband based on the transmit power allocated to the subband.

Data to be transmitted is coded and modulated based on one or more coding and modulation schemes to provide modulation symbols. The modulation symbols to be transmitted on each subband are then scaled with the subband's scaling value, and the scaled modulation symbols are further preconditioned with the subband's steering vector. A stream of preconditioned symbols is then formed for each transmit antenna, and this stream is further processed to generate a modulated signal suitable for transmission from a respective transmit antenna.

Various aspects and embodiments of the invention are described in further detail below. The invention further provides methods, program codes, digital signal processors, transmitter units, receiver units, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
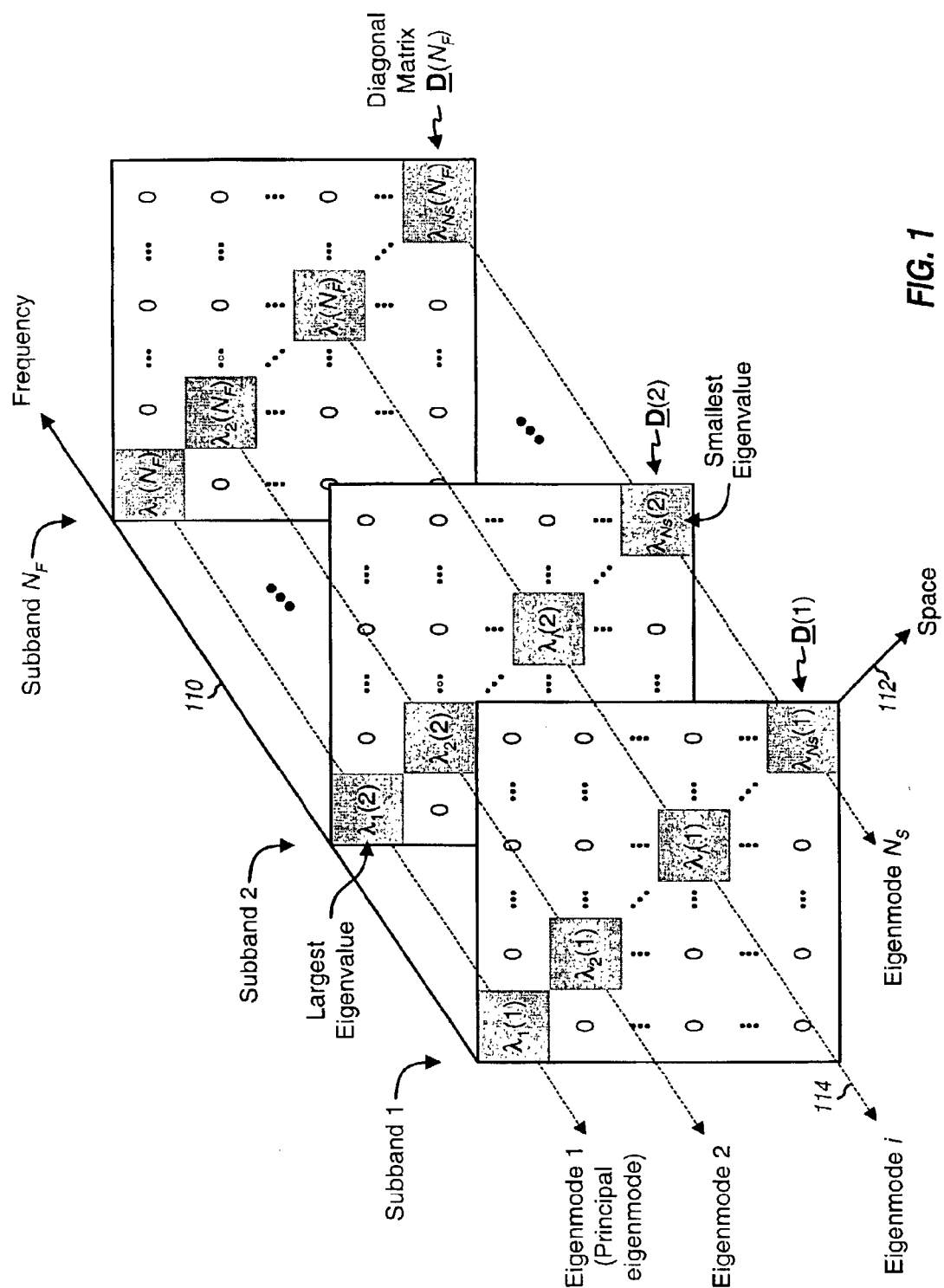
FIG. 1 graphically illustrates the results of eigenvalue decomposition for a number of subbands in a MIMO-OFDM system.

The beam-steering and beam-forming techniques described herein may be used in various wideband MIMO/MISO communication systems. For clarity, these techniques are described specifically for a MIMO-OFDM system that effectively divides the overall system bandwidth into $N_F$ orthogonal subbands.

The model for the MIMO-OFDM system may be expressed as:

$$y(k)=H(k)\underline{x}(k)+\underline{n}(k), \text{ for } k\in\{1,\ldots,N_F\} \quad \text{Eq(1)}$$

where y(k) is a vector with $N_R$ entries, $\{y_i(k)\}$ for $i\in\{1,\ldots,N_R\}$, for the symbols received via the $N_R$ receive antennas for the k-th subband (i.e., the "received" vector);

$\underline{x}$(k) is a vector with $N_T$ entries, $\{x_j(k)\}$ for $j\in\{1,\ldots,N_T\}$, for the symbols transmitted from the $N_T$ transmit antennas for the k-th subband (i.e., the "transmit" vector);

H(k) is an ($N_R\times N_T$) channel response matrix with entries, $\{h_{ij}(k)\}$ for $i\in\{1,\ldots,N_R\}$ and $j\in\{1,\ldots,N_T\}$, which are the complex gains from the $N_T$ transmit antennas to the $N_R$ receive antennas for the k-th subband; and $\underline{n}$(k) is additive white Gaussian noise (AWGN) for the k-th subband, with zero mean and a covariance matrix of $\underline{\Lambda}_n=\sigma^2 I$, where I is the identity matrix and $\sigma^2$ is the noise variance.

For simplicity, each subband is assumed to be frequency non-selective (i.e., with a flat frequency response across the entire subband). In this case, the channel response $h_{ij}(k)$ for each transmission channel can be represented by a single complex value, and the elements of the channel response matrix H(k) are scalars. Also for simplicity, the noise variance is assumed to be constant across all transmission channels. For a time division duplexed (TDD) system, the forward and reverse links share the same system bandwidth and each subband may be assumed to be reciprocal. That is, if H(k) represents the channel response matrix from antenna array A to antenna array B, then a reciprocal channel implies that the coupling from array B to array A is given by $H^H(k)$.

The channel response matrix H(k) for each subband may be "diagonalized" to obtain the $N_S$ independent channels for that subband. This can be achieved by performing eigenvalue decomposition on the correlation matrix of H(k), which is $R(k)=H^H(k)H(k)$, where $H^H(k)$ denotes the conjugate transpose of H(k). The eigenvalue decomposition of the correlation matrix R(k) may be expressed as:

$$R(k)=E(k)\underline{D}(k)E^H(k), \text{ for } k\in\{1,\ldots,N_F\} \quad \text{Eq(2)}$$

where E(k) is an ($N_T\times N_T$) unitary matrix whose columns are the eigenvectors of R(k); and $\underline{D}$(k) is an ($N_T\times N_T$) diagonal matrix with entries on the diagonal corresponding to the eigenvalues of R(k).

A unitary matrix is denoted by the property $M^H M=I$.

The eigenvalue decomposition may also be performed using singular value decomposition, as is known in the art.

The diagonal matrix $\underline{D}$(k) for each subband contains non-negative real values along the diagonal and zeros everywhere else. These diagonal entries are referred to as the eigenvalues of R(k) and are related to the complex gains for the independent channels (or eigenmodes) of the MIMO channel for the k-th subband. Since the number of independent channels is $N_S\leq\min\{N_T,N_R\}$ for a MIMO system with $N_T$ transmit and $N_R$ receive antennas, there are $N_S$ non-zero eigenvalues of R(k). The eigenvalues of R(k) are denoted as $\{\lambda_i(k)\}$, for $i=\{1,\ldots,N_S\}$ and $k=\{1,\ldots,N_F\}$.

For the MIMO-OFDM system, the eigenvalue decomposition may be performed independently for the channel response matrix H(k) for each subband to determine the $N_S$ eigenmodes for that subband. The $N_S$ eigenvalues for each diagonal matrix $\underline{D}$(k), for $k\in\{1,\ldots,N_F\}$, may be ordered such that $\{\lambda_1(k)\geq\lambda_2(k)\geq\ldots\geq\lambda_{N_S}(k)\}$, where $\lambda_1(k)$ is the largest eigenvalue and $\lambda_{N_S}(k)$ is the smallest eigenvalue for the k-th subband.

FIG. 1 graphically illustrates the results of the eigenvalue decomposition for the $N_F$ subbands in the MIMO-OFDM system. The set of diagonal matrices, $\underline{D}$(k) for $k=\{1,\ldots,N_F\}$, is shown arranged in order along an axis 110 that represents the frequency dimension. The eigenvalues, $\{\lambda_i(k)\}$ for $i=\{1,\ldots,N_S\}$, of each matrix $\underline{D}$(k) are located along the diagonal of the matrix. Axis 112 may thus be viewed as representing the spatial dimension. Eigenmode i for all subbands (or simply, eigenmode i) is associated with a set of elements, $\{\lambda_i(k)\}$ for $k=\{1,\ldots,N_F\}$, which is indicative of the frequency response across the $N_F$ subbands for that eigenmode. The set of elements $\{\lambda_i(k)\}$ for each eigenmode is shown by the shaded boxes along a dashed line 114. Each shaded box in FIG. 1 represents a transmission channel. For each eigenmode that experiences frequency selective fading, the elements $\{\lambda_i(k)\}$ for that eigenmode may be different for different values of k.

If the eigenvalues in each diagonal matrix $\underline{D}$(k) are sorted in descending order, then eigenmode 1 (which is also referred to as the principal eigenmode) would include the largest eigenvalue in each matrix, and eigenmode $N_S$ would include the smallest eigenvalue in each matrix.

Under adverse channel conditions, most of the eigenmodes may be highly degraded. In these situations, improved performance may be achieved by using only the best eigenmode (i.e., the principal eigenmode) for data transmission.

The model for a MISO-OFDM system may be expressed as:

$$y(k)=h(k)\underline{x}(k)+n(k), \text{ for } k\in\{1,\ldots,N_F\},$$

where y(k) denotes the symbol received on the k-th subband;

$\underline{x}$(k) is a vector with $N_T$ entries for the symbols transmitted from the $N_T$ transmit antennas for the k-th subband;

h(k) is a ($1\times N_T$) channel response vector with entries, $\{h_j(k)\}$ for $j\in\{1,\ldots,N_T\}$, which are the complex gains from the $N_T$ transmit antennas to the single receive antenna for the k-th subband; and n(k) is additive white Gaussian noise (AWGN) for the k-th subband.

For MIMO and MISO systems, data transmission on a single eigenmode may be achieved using beam-steering or beam-forming, both of which are described below.

1. Beam-Forming

The beam-forming technique transmits data on a single (e.g., principal) eigenmode by preconditioning the modulation symbols with the eigenvector for this eigenmode. For the MIMO-OFDM system, the beam-forming is performed for each subband using the eigenvector obtained for that subband.

In equation (2), the unitary matrix E(k) contains $N_T$ columns for $N_T$ eigenvectors, i.e., $E(k)=[\underline{e}_1(k)\underline{e}_2(k)\ldots\underline{e}_{N_T}(k)]$. The eigenvectors are also referred to as steering vectors. Each eigenvector is associated with a respective eigenmode and eigenvalue of the diagonal matrix $\underline{D}$(k) (i.e., eigenvector $\underline{e}_i(k)$ is associated with eigenvalue $\lambda_i(k)$ for subband k). When the eigenvalues of $\underline{D}$(k) are sorted in descending order as described above, the eigenvectors of E(k) are also rearranged in the corresponding order. After the sorting/rearrangement, eigenvector $\underline{e}_1(k)$ corresponds to the largest eigenvalue $\lambda_1(k)$ and is the eigenvector for the principal eigenmode for the k-th subband. This eigenvector $\underline{e}_1(k)$ includes $N_T$ elements for the $N_T$ transmit antennas and can be expressed as:

$$\underline{e}_1(k)=[e_{1,1}(k)e_{1,2}(k)\ldots e_{1,N_T}(k)]^T, \text{ for } k\in\{1,\ldots,N_F\}, \quad \text{Eq(3)}$$

where "$^T$" denotes the transpose.

The preconditioning at the transmitter to achieve beam-forming for each subband may be expressed as:

$$\underline{x}(k) = \sqrt{P(k)}\underline{e}_1(k)s(k), \text{ for } k \in \{1, \ldots, N_F\}, \quad \text{Eq(4)}$$

where s(k) is the modulation symbol to be transmitted on the k-th subband;

$\sqrt{P(k)}$ is a scaling value derived based on the transmit power P(k) allocated to the k-th subband; and $\underline{x}(k)$ is the transmit vector with $N_T$ preconditioned symbols for the k-th subband.

As shown in equation (4), the beam-forming technique generates one transmit vector $\underline{x}(k)$ for each subband based on the eigenvector $\underline{e}_1(k)$ for the principal eigenmode. Since the elements of the eigenvector $\underline{e}_1(k)$ may have different magnitudes, the elements of the transmit vector $\underline{x}(k)$ may also have different magnitudes.

For each transmit antenna i, the $N_F$ preconditioned symbols to be transmitted on the $N_F$ subbands in symbol period n are multiplexed together into a (per-antenna transmit) vector $\underline{x}_i(n)$, which may be expressed as:

$$\underline{x}_i(n) = [e_{1,i}(1)\tilde{s}(1) e_{1,i}(2)\tilde{s}(2) \ldots e_{1,i}(N_F)\tilde{s}(N_F)]^T, \text{ for } i \in \{1, \ldots, N_t\},$$

where $\tilde{s}(k)$ is a scaled modulation symbol and given as $\tilde{s}(k) = \sqrt{P(k)}s(k)$.

For the MISO-OFDM system, the beam-forming is also performed for each subband using the steering vector obtained for that subband. If the channel decomposition is performed on the channel response vector h(k), the result will be one eigenmode (i.e., one non-zero value for the matrix $\underline{D}(k)$) and one steering vector. This steering vector will be equal to h*(k). The beam-forming for MISO may be performed as shown in equation (4).

2. Beam-Steering

The beam-steering technique transmits data on the principal eigenmode by preconditioning the modulation symbols with a "normalized" steering vector for this eigenmode. The beam-steering is also performed for each subband for the MIMO-OFDM system.

As noted above, the elements of each eigenvector $\underline{e}_1(k)$, for $k \in \{1, \ldots, N_F\}$, for the principal eigenmode may have different magnitudes. Consequently, the per-antenna transmit vectors $\underline{x}_i(n)$, for $i \in \{1, \ldots, N_T\}$, may have different magnitudes. If the transmit power for each transmit antenna is limited (e.g., because of limitations of the power amplifiers), then the beam-forming technique may not fully use the total power available for each antenna.

The beam-steering technique uses only the phase information from the eigenvectors $\underline{e}_1(k)$, for $k \in \{1, \ldots, N_F\}$, and normalizes each transmit steering vector such that all $N_T$ elements have equal magnitudes. The normalized steering vector $\underline{\tilde{e}}(k)$ for the k-th subband may be expressed as:

$$\underline{\tilde{e}}(k) = [Ae^{j\theta_1(k)} Ae^{j\theta_2(k)} \ldots Ae^{j\theta_{N1}(k)}]^T, \quad \text{Eq(5a)}$$

where A is a constant (e.g., A=1); and $\theta_i(k)$ is the phase for the k-th subband of the i-th transmit antenna, which is given as:

$$\theta_i(k) = \angle e_{1,i}(k) = \tan^{-1}\left(\frac{\text{Im}\{e_{1,i}(k)\}}{\text{Re}\{e_{1,i}(k)\}}\right). \quad \text{Eq (5b)}$$

As shown in equation (5b), the phase of each element in the vector $\underline{\tilde{e}}(k)$ is obtained from the corresponding element of the eigenvector $\underline{e}_1(k)$ (i.e., $\theta_i(k)$ is obtained from $e_{1,i}(k)$).

The preconditioning at the transmitter to achieve beam-steering for each subband may be expressed as:

$$\underline{x}(k) = \sqrt{P(k)}\underline{\tilde{e}}(k)s(k), \text{ for } k \in \{1, \ldots, N_F\}. \quad \text{Eq(6)}$$

As shown in equations (5a) and (5b), the elements of the normalized steering vector $\underline{\tilde{e}}(k)$ for each subband have equal magnitude but possibly different phases. The beam-steering technique generates one transmit vector $\underline{x}(k)$ for each subband, with the elements of $\underline{x}(k)$ having the same magnitude but possibly different phases.

As described above, for each transmit antenna i, the $N_F$ preconditioned symbols to be transmitted on the $N_F$ subbands in symbol period n are multiplexed together into a per-antenna transmit vector $\underline{x}_i(n)$. Since each transmit vector $\underline{x}_i(n)$, for $i \in \{1, \ldots, N_T\}$, includes the same set of scaled modulation symbols (but possibly with different phases), the total available transmit power for each antenna may be fully used.

At the receiver, to obtain an estimate of the modulation symbol s(k), the received vector y(k) for each subband may be pre-multiplied (or "conditioned") with either $\underline{\tilde{e}}^H(k)\underline{H}^H(k)$ (if beam-steering was performed) or $\underline{e}_1^H(k)\underline{H}^H(k)$ (if beam-forming was performed). If beam-steering was performed, then the conditioning to obtain the symbol estimate $\hat{s}(k)$ may be expressed as:

$$\hat{s}(k) = \underline{\tilde{e}}^H(k)\underline{H}^H(k)\underline{y}(k) \quad \text{Eq (7)}$$

$$= \sqrt{P(k)} \underline{\tilde{e}}^H(k)\underline{H}^H(k)\underline{H}(k)\underline{\tilde{e}}(k)s(k) + \underline{\tilde{e}}^H(k)\underline{H}^H(k)\underline{n}(k)$$

$$= \sqrt{P(k)} D(k)s(k) + \hat{n}(k),$$

where D(k) is the beam-steering gain for the k-th subband, which can be expressed as $$D(k) = \underline{\tilde{e}}^H(k)H^H(k)H(k)\underline{\tilde{e}}(k), \text{ and} \quad \text{Eq(8)}$$

$\hat{n}(k)$ is AWGN with zero mean and a noise variance of $\sigma^2 D(k)$.

The received signal-to-noise ratio (SNR) for the k-th subband with beam-steering may be expressed as:

$$\gamma_{bs}(k) = \frac{P(k)D(k)}{\sigma^2}, \text{ for } k \in \{1, \ldots, N_F\}. \quad \text{Eq (9)}$$

The spectral efficiency for the k-th subband may be computed based on a continuous, monotonically increasing logarithmic function for capacity, as follows:

$$C_{bs}(k) = \log_2(1 + \gamma_{bs}(k)), \text{ for } k \in \{1, \ldots, N_F\}. \quad \text{Eq(10)}$$

The spectral efficiency is given in units of bit/second per Hertz (bps/Hz). The mean (average) spectral efficiency for the $N_F$ subbands of the MIMO-OFDM system may then be expressed as:

$$\overline{C}_{bs} = \frac{\sum_{k=1}^{N_F} C_{bs}(k)}{N_F}. \quad \text{Eq (11)}$$

Similar computations may be performed for the beam-forming technique.

For the MISO-OFDM system, the beam-steering is also performed for each subband using a normalized steering vector obtained for that subband. The normalized steering vector for MISO may be obtained in similar manner as that described above for the normalized steering vector $\underline{\hat{e}}(k)$ for the principal eigenmode (i.e., using the phase of the steering vector). The beam-steering for MISO may be performed as shown in equation (6).

3. Power Allocation for the Subbands

If the total transmit power for all $N_T$ transmit antennas is limited to a particular value $P_{total}$, then the beam-forming technique may provide better results than the beam-steering technique. This is because the total transmit power may be more optimally distributed across the $N_T$ transmit antennas based on the eigenvectors $\underline{e}_1(k)$ for the principal eigenmode. However, if the transmit power available for each transmit antenna is limited (e.g., to $P_{total}/N_T$), then the beam-steering technique would likely achieve better results than the beam-forming technique. This is because the beam-steering technique can more fully use all of the power available for each transmit antenna.

In any case, the total transmit power $P_{total}$ may be distributed across the $N_T$ transmit antennas and the $N_F$ subbands using various power allocation schemes. These schemes include (1) full channel inversion, (2) selective channel inversion, (3) uniform, and (4) "water-filling" or "water-pouring" power allocation schemes. For clarity, each of these schemes is specifically described below for the beam-steering technique.

4. Full Channel Inversion

If the same amount of transmit power is used for each subband, then beam-steering can result in different received SNRs for the $N_F$ subbands. To maximize spectral efficiency, a different coding and modulation scheme may then be used for each subband depending on the SNR achieved for the subband. However, coding and modulating individually for each subband can significantly increase the complexity of both the transmitter and receiver. On the other hand, if the same coding and modulation scheme is used for all subbands, then there may be significant variation in the error rates for the $N_F$ subbands, depending on the variation in the received SNRs.

Full channel inversion may be used to effectively "invert" the subbands such that the received SNRs for all subbands are approximately equal. The power allocation may be performed under the constraint that the total power allocated to all subbands for each transmit antenna is limited to $P_{ant}=P_{total}/N_T$. For full channel inversion, the amount of transmit power $P(k)$ to allocate to each subband may be expressed as:

$$P(k) = \frac{\alpha_k P_{total}}{N_T N_F}, \text{ for } k \in \{1, \ldots, N_F\}, \quad \text{Eq (12)}$$

where $\alpha_k$ is a scaling factor used for the full channel inversion power allocation. The scaling factor for the k-th subband may be expressed as:

$$\alpha_k = \frac{b}{|D(k)|}, \quad \text{Eq (13)}$$

where b is a normalization factor that may be expressed as:

$$b = \frac{1}{\sum_{k=1}^{N_F} |D(k)|^{-1}}. \quad \text{Eq (14)}$$

As shown in equations (12) and (13), the total transmit power $P_{total}$ is distributed unevenly across the $N_F$ subbands based on the scaling factors $\alpha_k$, for $k \in \{1, \ldots, N_F\}$, which are inversely related to the beam-steering gains $D(k)$. The scaling factors $\alpha_k$ ensure that the received SNRs for all subbands are approximately equal. The received signal power $P_{rx}(k)$ for each subband may be given as:

$$P_{rx}(k) = P(k)D(k)^2 = \frac{\alpha_k P_{total} D(k)^2}{N_T N_F} = \frac{b P_{total} D(k)}{N_T N_F}, \quad \text{Eq (15)}$$

$$\text{for } k \in \{1, \ldots, N_F\}.$$

The noise power is given by $\sigma^2 D(k)$. The signal-to-noise ratio $\gamma(k)$ for subband k is then given by:

$$\gamma(k) = \frac{P(k)D(k)^2}{\sigma^2 D(k)} = \frac{P(k)D(k)}{\sigma^2} = \frac{\alpha_k P_{total} D(k)}{N_T N_F \sigma^2} = \frac{b P_{total}}{N_T N_F \sigma^2}. \quad \text{Eq (16)}$$

The total received signal power $P_{rx}$ may then be given as:

$$P_{rx} = \sum_{k=1}^{N_F} P(k)D(k)^2 = \frac{b P_{total}}{N_T N_F} \sum_{k=1}^{N_F} D(k).$$

The total transmit power $P_{total}$ is allocated to the subbands such that they achieve equal received SNRs (i.e., the received SNR for each subband is not a function of k), as shown in equation (16). This then enables the use of a common coding and modulation scheme for all subbands while satisfying the per-antenna power constraint.

To achieve approximately equal received SNRs for all $N_F$ subbands, the full channel inversion scheme allocates more transmit power to poorer subbands with low gains. Because the per-antenna power is constrained to $P_{total}/N_T$, the better subbands with higher gains are allocated less transmit power. This can result in a reduction in the overall spectral efficiency of the system. However, the full channel inversion may simplify the processing at the receiver since the overall channel is effectively flat and equalization of the received signal may not be required.

5. Selective Channel Inversion

The selective channel inversion scheme distributes the total transmit power $P_{total}$ such that the subbands selected for use achieve approximately equal received SNRs. This may be performed by first selecting all or only a subset of the $N_F$ subbands for use for data transmission. The channel selection may result in the elimination of poor subbands with low SNRs that fall below a particular threshold. This threshold may be selected to maximize spectral efficiency, as described below. The total transmit power $P_{total}$ is then distributed across only the selected subbands and such that their received SNRs are approximately equal.

The scaling factors $\alpha_k$ used for power allocation by the selective channel inversion scheme may be expressed as:

$$\tilde{\alpha}_k = \begin{cases} \frac{\tilde{b}}{|D(k)|^{-1}}, & \text{if } |D(k)| > \rho L_{avg} \\ 0, & \text{otherwise}, \end{cases} \quad \text{Eq (17)}$$

where $\rho$ is a value used to set the threshold, $L_{avg}$ is the average gain, and $\tilde{b}$ is a normalization factor. The normalization factor $\tilde{b}$ is similar to b in equation (14) but is computed over only the selected subbands, and may be expressed as:

$$\tilde{b} = \frac{1}{\sum_{|D(k)| \geq \rho L_{avg}} |D(k)|^{-1}}. \qquad \text{Eq. (18)}$$

The average gain $L_{avg}$ may be computed as:

$$L_{avg} = \frac{\sum_{k=1}^{N_F} |D(k)|}{N_F}. \qquad \text{Eq. (19)}$$

As shown in equation (17), a given subband is selected for use if its beam steering gain is greater than or equal to the threshold (i.e., $|D(k)| \geq \rho L_{avg}$). Since no transmit power is allocated to poor subbands with gains below the threshold, higher spectral efficiency may be attained. For the subbands selected for use, the total transmit power $P_{total}$ is distributed to these subbands based on their scaling factors $\alpha_k$, similar to that shown in equation (15), such that the received signal power for each selected subband is given as $\tilde{b} P_{total} D(k)/N_T N_F$ and all selected subbands have approximately equal received SNR.

The threshold used to select subbands may be set based on various criteria. The threshold that maximizes spectral efficiency may be determined as follows. Initially, the gains $D(k)$ for all $N_F$ subbands are ranked and placed in descending order in a list $G(l)$, for $l \in \{1, \ldots, N_F\}$, such that $G(1)=\max\{D(k)\}$ and $G(N_F)=\min\{D(k)\}$. A sequence $B(l)$ is then defined as follows:

$$B(l) = \left( \sum_{i=1}^{l} (G(i)^{-1}) \right)^{-1}, \text{ for } l \in (1, \ldots, N_F). \qquad \text{Eq. (20)}$$

$B(l)$ is the list of $\tilde{b}$ if the best l subbands are used.

The received SNR on all the selected subbands, which results when the l best subbands are selected for use, is given as:

$$\hat{\gamma}(l) = \frac{B(l) P_{total}}{\sigma^2 N_T}. \qquad \text{Eq. (21)}$$

For equation (21), the total transmit power $P_{total}$ is allocated among the l best subbands such that they achieve equal received SNRs.

If the l best subbands are selected for use, then the total spectral efficiency for these subbands is given as:

$$C(l) = l \log_2(1 + \hat{\gamma}(l)). \qquad \text{Eq(22)}$$

The spectral efficiency $C(l)$ may be computed for each value of l, for $l \in \{1, \ldots, N_F\}$, and stored in an array. After all $N_F$ values of $C(l)$ have been computed for the $N_F$ possible combinations of selected subbands, the array of spectral efficiencies is traversed and the largest value of $C(l)$ is determined. The value of l, $l_{max}$, corresponding to the largest $C(l)$ is then the number of subbands that results in the maximum spectral efficiency for the channel conditions being evaluated.

The value $\rho$ may then be computed as:

$$\rho = \frac{G(l_{max})}{L_{avg}}, \qquad \text{Eq (23)}$$

where $L_{avg}$ is determined as shown in equation (19). The threshold $\rho L_{avg}$ can thus be set equal to $D(l_{max})$, which is the gain of the worst subband in the group of subbands that maximizes spectral efficiency. The threshold used for channel selection may also be set based on some other criterion.

The received SNRs for all selected subbands can be made approximately equal by distributing the total transmit power $P_{total}$ non-uniformly across these subbands. The equal received SNRs would then allow for the use of a single data rate and a common coding and modulation scheme for all selected subbands, which would greatly reduce complexity for both the transmitter and receiver.

The full and selective channel inversion schemes are described in further detail in U.S. patent application Ser. No. 09/860,274, filed May 17, 2001, Ser. No. 09/881,610, filed Jun. 14, 2001, and Ser. No. 09/892,379, filed Jun. 26, 2001, all three entitled "Method and Apparatus for Processing Data for Transmission in a Multi-Channel Communication System Using Selective Channel Inversion," assigned to the assignee of the present application and incorporated herein by reference.

6. Water-Filling

The water-filling scheme may be used to optimally distribute the total transmit power across the subbands such that the overall spectral efficiency is maximized, under the constraint that the total transmit power is limited to $P_{total}$. The water-filling scheme distributes power to the $N_F$ subbands such that the subbands with increasingly higher gains receive increasingly greater fractions of the total transmit power. The transmit power allocated to a given subband is determined by the subband's received SNR, which is dependent on the subband's gain, as shown in equation (9) for the beam-steering technique. The water-filling scheme may allocate zero transmit power to subbands with sufficiently poor received SNRs.

The procedure for performing water-filling is known in the art and not described herein. One reference that describes water-filling is "Information Theory and Reliable Communication," by Robert G. Gallager, John Wiley and Sons, 1968, which is incorporated herein by reference. The result of the water-filling is a specific transmit power allocation $P_w(k)$ for each of the $N_F$ subbands. The water-filling power allocation is performed such that the following condition is satisfied:

$$P_{total} = \sum_{k=1}^{N_F} P_w(k). \qquad \text{Eq (24)}$$

Based on the allocated transmit powers of $P_w(k)$ for $k=\{1, \ldots, N_F\}$, where $P_w(k)$ may be zero for one or more subbands, the received SNR for each subband may be expressed as:

$$\gamma_w(k) = \frac{P_w(k) D(k)}{\sigma^2}, \text{ for } k \in (1, \ldots, N_F). \qquad \text{Eq (25)}$$

The spectral efficiency C for each subband may then be computed as shown in equation (10), and the average spectral efficiency for all $N_F$ subbands may be computed as shown in equation (11).

The water-filling power allocation typically results in different received SNRs for the subbands that have been allocated non-zero transmit powers. Different coding and modulation schemes may then be used for the selected subbands based on their received SNRs.

7. Uniform Power Allocation

The uniform power allocation scheme distributes the total transmit power $P_{total}$ uniformly across all $N_F$ subbands. The transmit power $P_u(k)$ allocated to each subband may be expressed as:

$$P_u(k) = \frac{P_{total}}{N_T N_F}, \text{ for } k \in \{1, \ldots, N_F\}. \quad \text{Eq (26)}$$

The uniform power allocation may also result in different received SNRs for the $N_F$ subbands. Different coding and modulation schemes may then be used for these subbands based on their received SNRs. If the MIMO system has a large diversity order, then the full and selective channel inversion schemes offer little advantage over the uniform power scheme. If the MIMO system has a large diversity order, then the $N_F$ largest eigenvalues for the $N_F$ subbands are not likely to vary widely. In that case, the performance of the full and selective channel inversion schemes would be similar to that of the uniform power scheme.

The total transmit power may also be allocated to the subbands based on some other power allocation schemes, and this is within the scope of the invention.

Figure 2:
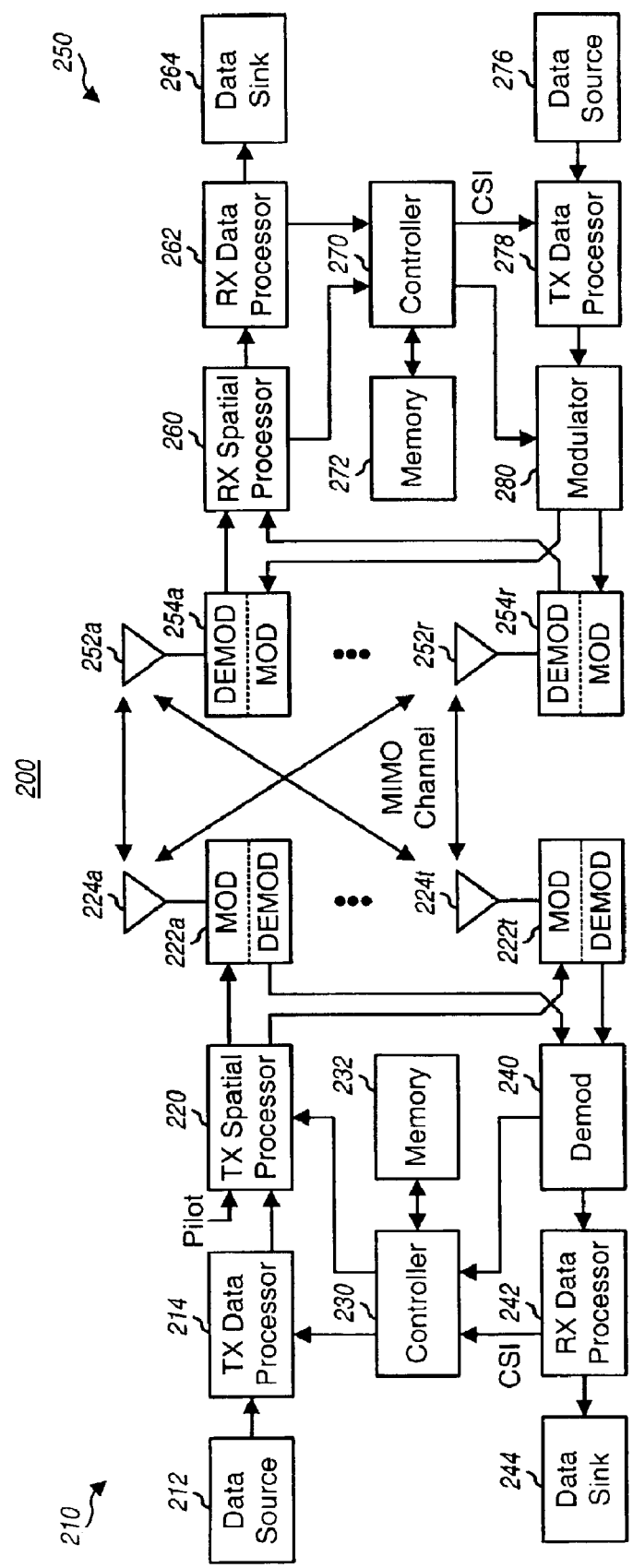
FIG. 2 is a block diagram of a transmitter system and a receiver system in the MIMO-OFDM system.

Simulations were performed for (1) the beam-steering technique with three different power allocation schemes (full channel inversion, selective channel inversion, and uniform) and (2) the beam-forming technique with uniform power allocation. When the transmit power available for each transmit antenna is limited (e.g., to $P_{total}/N_T$), the beam-steering technique provides approximately 2.5 dB improvement in performance over the beam-forming technique. This significant improvement can be attributed to the fact that all of the available power is used by the beam-steering technique, which is not the case with the beam-forming technique. At a sufficiently low received SNR (which is −1 dB for the specific system configuration used in the simulations), the beam-steering technique can provide improved performance over a technique that transmits data using all of the eigenmodes and allocates the total transmit power uniformly across these eigenmodes. This is because at sufficiently low received SNRs, only a few eigenmodes are "active", and better performance may be achieved by allocating the total transmit power to the best eigenmode. For the beam-steering technique, selective channel inversion performs better than full channel inversion at low received SNRs and when the estimates of the MIMO channel are noisy. The simulations suggest that, at low received SNRs, beam steering with selective channel inversion is a better choice for use than other MIMO transmission schemes 8. System FIG. 2 is a block diagram of an embodiment of a transmitter system 210 and a receiver system 250 in a MIMO-OFDM system 200.

At transmitter system 210, traffic data (i.e., information bits) from a data source 212 is provided to a transmit (TX) data processor 214, which codes, interleaves, and modulates the data to provide modulation symbols. A TX spatial processor 220 further processes the modulation symbols to provide preconditioned symbols, which are then multiplexed with pilot symbols and provided to $N_T$ OFDM modulators (MOD) 222a through 222t, one modulator for each transmit antenna. Each OFDM modulator 222 processes a respective stream of preconditioned symbols to generate a modulated signal, which is then transmitted from a respective antenna 224.

At receiver system 250, the modulated signals transmitted from the $N_T$ antennas 224a through 224t are received by $N_R$ antennas 252a through 252r. The received signal from each antenna 252 is provided to a respective OFDM demodulator (DEMOD) 254. Each OFDM demodulator 254 conditions (e.g., filters, amplifies, and frequency downconverts) the received signal, digitizes the conditioned signal to provide samples, and further processes the samples to provide a stream of received symbols. An RX spatial processor 260 then processes the $N_R$ received symbol streams to provide recovered symbols, which are estimates of the modulation symbols transmitted by the transmitter system.

The processing for the reverse path from the receiver system to the transmitter system may be similar to, or different from, the processing for the forward path. The reverse path may be used to send back channel state information (CSI) from the receiver system to the transmitter system. The CSI is used at the transmitter system to (1) select the proper data rate(s) and coding and modulation scheme(s) to use for data transmission, (2) perform beam-steering or beam-forming, and (3) allocate the total transmit power to the subbands. The CSI may be provided in various forms. For example, to perform beam-steering, the CSI may include $N_T$ phases for the $N_T$ transmit antennas for each subband selected for use.

Controllers 230 and 270 direct the operation at the transmitter and receiver systems, respectively. Memories 232 and 272 provide storage for program codes and data used by controllers 230 and 270, respectively.

The block diagram of the transmitter and receiver systems in a MISO-OFDM system would be similar to that shown in FIG. 2. However, the receiver system would include only one receive antenna and no RX spatial processor 260.

Figure 3:
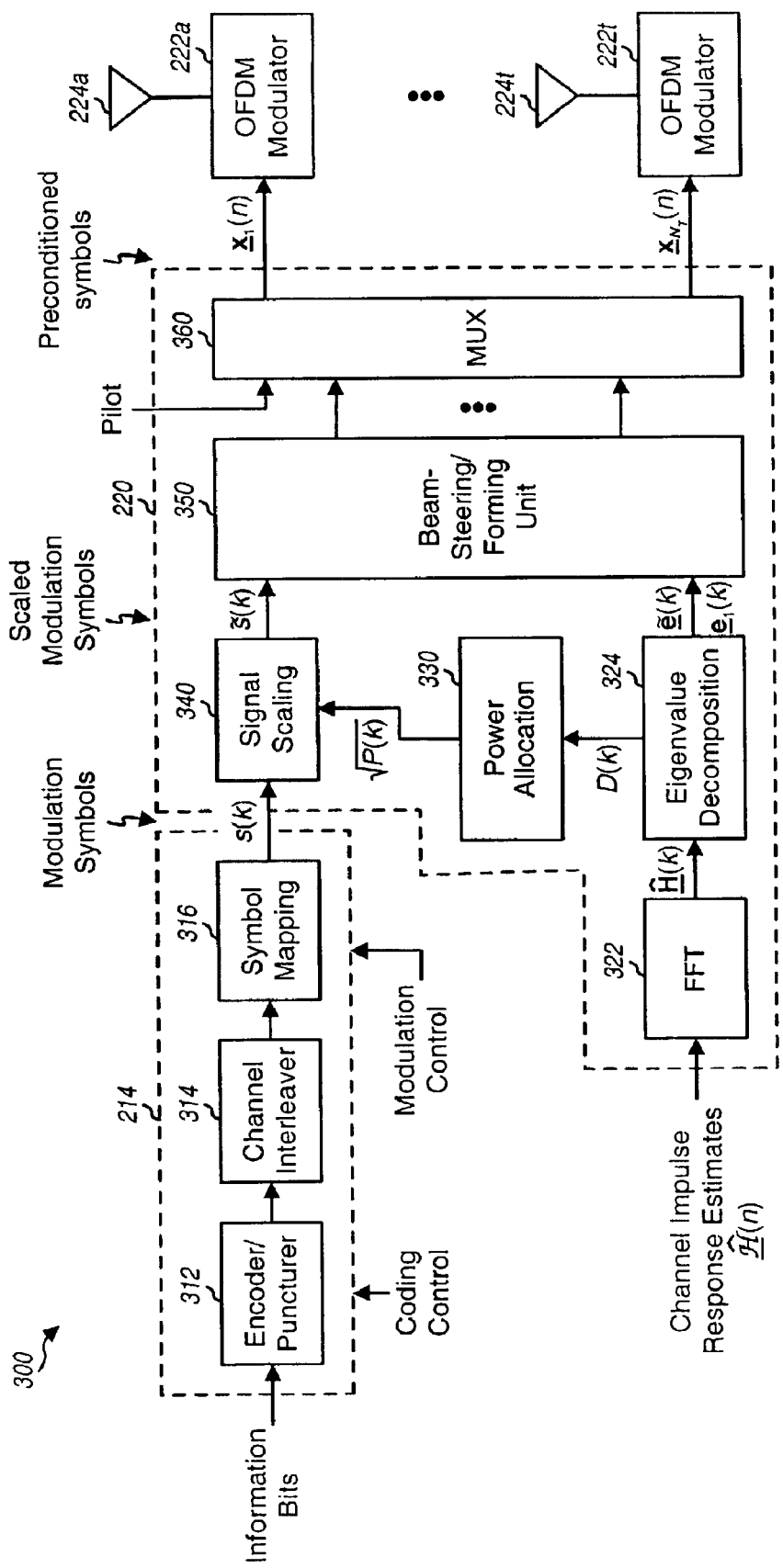
FIG. 3 is a block diagram of a transmitter unit within the transmitter system.

FIG. 3 is a block diagram of a transmitter unit 300, which is an embodiment of the transmitter portion of transmitter system 210 in FIG. 2.

Within TX data processor 214, an encoder 312 receives and codes the traffic data (i.e., the information bits) in accordance with one or more coding schemes to provide coded bits. A channel interleaver 314 then interleaves the coded bits based on one or more interleaving schemes to provide time, spatial, and/or frequency diversity. A symbol mapping element 316 then maps the interleaved data in accordance with one or more modulation schemes (e.g., QPSK, M-PSK, M-QAM, and so on) to provide modulation symbols.

The coding and modulation for the subbands may be performed in various manners. If the received SNRs for the subbands are approximately equal at the receiver system (e.g., with full or selective channel inversion), then a common coding and modulation scheme may be used for all subbands used for data transmission. If the received SNRs are different, then a separate coding and modulation scheme may be used for each subband (or each group of subbands with approximately equal received SNRs). Convolutional, trellis, and Turbo coding may be used to code the data.

Within TX spatial processor 220, estimates of the impulse response of the MIMO channel are provided to a fast Fourier transform (FFT) unit 322 as a sequence of matrices of time-domain samples, $\hat{H}(n)$. FFT unit 322 then performs an FFT on each set of $N_F$ matrices $\hat{H}(n)$ to provide a corresponding set of $N_F$ estimated channel frequency response matrices, $\hat{H}(k)$ for $k \in \{1, \ldots, N_F\}$.

A unit 324 then performs eigenvalue decomposition on each matrix $\hat{H}(k)$ to provide the unitary matrix E(k) and the diagonal matrix $\underline{D}(k)$, as described above. A set of gains $D(k)$ is then computed based on the matrices $\hat{H}(k)$ and the steering vectors, which may be $\underline{\tilde{e}}(k)$ or $\underline{e}_1(k)$, for $k \in \{1, \ldots, N_F\}$. The gains $D(k)$ are provided to a power allocation unit 330 and the steering vectors are provided to a beam-steering/forming unit 350.

Power allocation unit 330 distributes the total transmit power $P_{total}$ to the subbands using any one of the power allocation schemes described above. This results in power allocations of $P(k)$, for $k \in \{1, \ldots, N_F\}$, for the $N_F$ subbands, where $P(k)$ may be zero for one or more subbands. Power allocation unit 330 then provides scaling values $\sqrt{P(k)}$ for the subbands to a signal scaling unit 340.

The block diagram of the transmitter unit in a MISO-OFDM system would be similar to that shown in FIG. 3. However, the steering vector for each subband is derived based on a channel response vector $\hat{h}(k)$ instead of the channel response matrix $\hat{H}(k)$.

Figure 4:
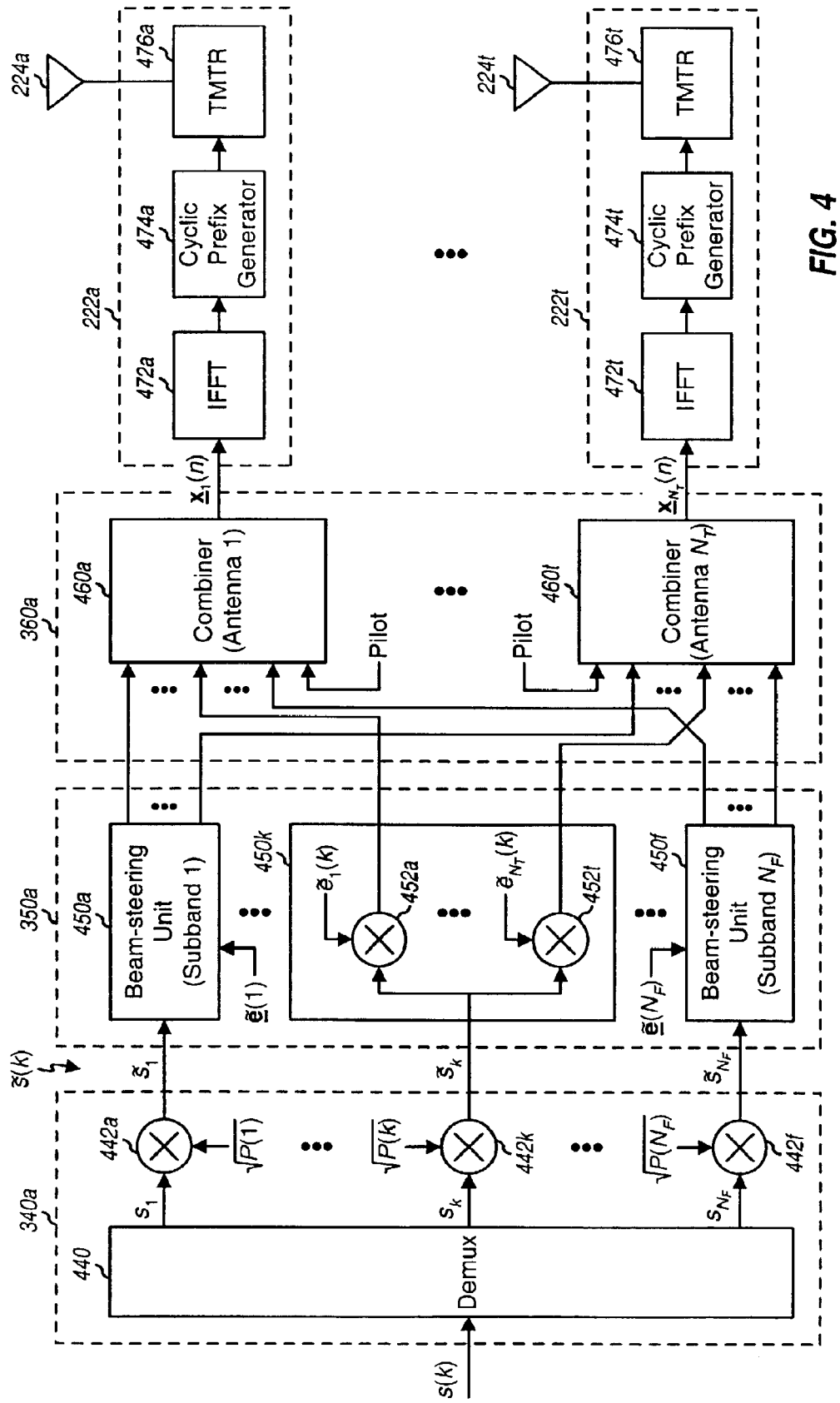
FIG. 4 is a block diagram of a signal scaling unit, a beam-steering unit, and a multiplexer within the transmitter unit.

FIG. 4 is a block diagram of an embodiment of a signal scaling unit 340a, a beam-steering unit 350a, and a multiplexer 360a within transmitter unit 300, which are designed to perform beam-steering. Within signal scaling unit 340a, the modulation symbols $s(k)$ are demultiplexed by a demultiplexer 440 into (up to) $N_F$ substreams, one substream for each subband to be used for data transmission. Each symbol substream $s_k$ is provided to a respective multiplier 442.

Each multiplier 442 performs signal scaling for an associated subband based on the scaling value $\sqrt{P(k)}$ provided for that subband. In particular, each multiplier 442 scales each modulation symbol in its substream with its scaling value $\sqrt{P(k)}$ to provide a corresponding scaled modulation symbol. The signal scaling for each modulation symbol may be expressed as:

$$\tilde{s}_k = s_k \sqrt{P(k)}.$$

The scaling value $\sqrt{P(k)}$ for each multiplier 442 is determined by the transmit power $P(k)$ allocated to the associated subband. Each substream of scaled modulation symbols $\tilde{s}_k$ is then provided to a respective beam-steering unit 450.

Each beam-steering unit 450 performs beam-steering for an associated subband and also receives the normalized steering vector $\underline{\tilde{e}}(k)$ for that subband. Within each unit 450, the scaled modulation symbols $\tilde{s}_k$ are provided to $N_T$ multipliers 452a through 452t, one multiplier for each transmit antenna. Each multiplier 452 also receives a respective element $\tilde{e}_i(k)$ of the normalized steering vector $\underline{\tilde{e}}(k)$, multiplies each scaled modulation symbol in the substream with the element $\tilde{e}_i(k)$, and provides a preconditioned symbol $x_i(k)$ to a combiner 460 for the transmit antenna associated with that multiplier. The preconditioning performed by beam-steering unit 450k for the k-th subband may be expressed as:

$$x_i(k) = \tilde{e}_i(k)$$

$$\tilde{s}_k, \text{ for } i \in \{1, \ldots, N^T\}.$$

Each beam-steering unit 450 provides $N_T$ preconditioned symbols, $x_i(k)$ for $i \in \{1, \ldots, N_T\}$, to $N_T$ combiners 460a through 460t for the $N_T$ transmit antennas.

The signal scaling and preconditioning may also be combined or performed in a different order than that described above.

Each combiner 460 receives up to $N_F$ preconditioned symbols, $x_i(k)$ for $k \in \{1, \ldots, N_F\}$, from up to $N_F$ beam-steering units 450 for the up to $N_F$ subbands used for data transmission. Each combiner 460 may also multiplex pilot symbols with the preconditioned symbols in one or more subbands using time division multiplexing, coding division multiplexing, and/or frequency division multiplexing. The pilot symbols may be used at the receiver to estimate the MIMO channel. Each combiner 460 provides a stream of preconditioned symbols to a respective OFDM modulator 222.

Within each OFDM modulator 222, an IFFT unit 472 receives the stream of preconditioned symbols and forms a preconditioned symbol vector $\underline{x}_i(n)$ for each symbol period. Each such vector has $N_F$ elements for the $N_F$ subbands, and includes preconditioned symbols for the selected subbands and zeros for the unselected subbands (i.e., $\underline{x}_i(n) = [x_i(1) x_i(2) \ldots x_i(N_F)]$). IFFT unit 472 then performs an inverse FFT on each vector to obtain a corresponding time-domain representation, which is referred to as an OFDM symbol. For each OFDM symbol, a cyclic prefix generator 474 repeats a portion of the OFDM symbol to form a corresponding transmission symbol. The cyclic prefix ensures that the transmission symbol retains its orthogonal properties in the presence of multipath delay spread. A transmitter (TMTR) 476 then converts the transmission symbols into one or more analog signals and further conditions (e.g., amplifies, filters, and frequency upconverts) the analog signals to generate a modulated signal that is then transmitted from the associated antenna 224.

Figure 5:
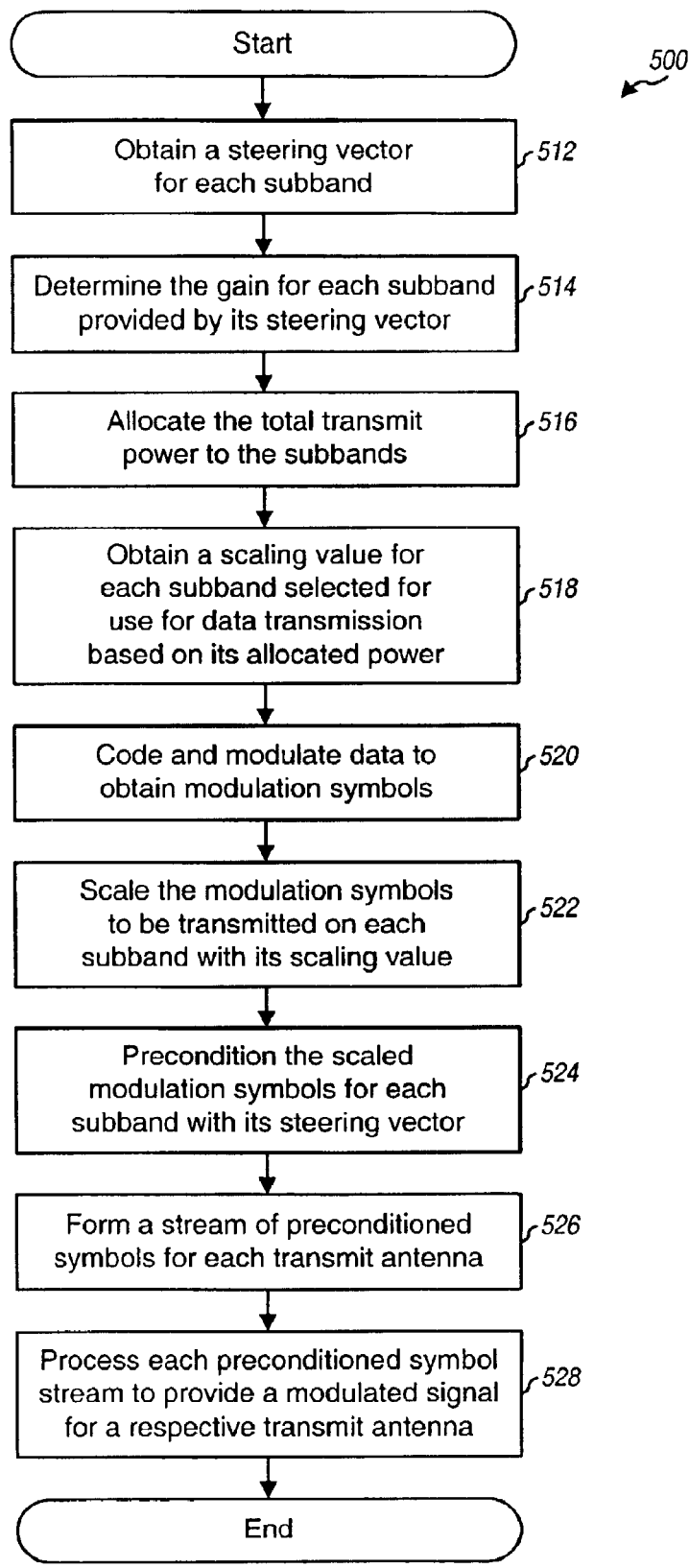
FIG. 5 is a flow diagram for processing data for transmission on a single eigenmode of a multiple-input channel using beam-steering or beam-forming.

FIG. 5 is a flow diagram of an embodiment of a process 500 for transmitting data on a single eigenmode of a multiple-input channel using beam-steering or beam-forming. The multiple-input channel may be a MIMO channel in a MIMO system or a MISO channel in a MISO system. Initially, a steering vector is obtained for each of the $N_F$ subbands (step 512). The steering vector for each subband may be the eigenvector $\underline{e}_1(k)$ for the eigenmode of that subband (for beam-forming) or the normalized steering vector $\underline{\tilde{e}}(k)$ derived based on the eigenvector $\underline{e}_1(k)$ (for beam-steering). For the MIMO system, the eigenvectors for the subbands may be obtained by performing eigenvalue decomposition on the matrices $\hat{H}(k)$, for $k \in \{1, \ldots, N_F\}$, as described above. For the MISO system, there is only one eigenmode and one steering vector for each subband. Each steering vector includes $N_T$ elements for the $N_T$ transmit antennas. The gain $D(k)$ for each subband provided by its steering vector is then determined (e.g., as shown in equation (8) for beam-steering) (step 514).

The total transmit power $P_{total}$ is allocated to the subbands using any one of the power allocation schemes described above (e.g., full channel inversion, selective channel inversion, uniform, or water-filling) (step 516). The gains for the subbands may be used to perform the power allocation. All or only a subset of the $N_F$ subbands may be selected for use for data transmission by the power allocation. A scaling value $\sqrt{P(k)}$ is then obtained for each selected subband based on its allocated power (step 518).

Data to be transmitted is coded and modulated based on one or more coding and modulation schemes to obtain modulation symbols (step 520). A common coding and modulation scheme may be used if the received SNRs for the subbands are approximately equal. In general, the particular coding and modulation scheme to use for each subband is dependent on the received SNR achieved by that subband.

The modulation symbols to be transmitted on each subband are then scaled with the subband's scaling value (step 522). The scaled modulation symbols for each subband are then preconditioned with the subband's steering vector (step 524). The preconditioning achieves beam-steering or beam-forming for the subband, depending on whether $\underline{\tilde{e}}(k)$ or $\underline{e}_1(k)$ is used as the steering vector. For each subband selected for use, one vector of $N_T$ preconditioned symbols is generated for each scaled modulation symbol, and these $N_T$ preconditioned symbols are to be transmitted on that subband from the $N_T$ transmit antennas.

A stream of preconditioned symbols is then formed for each transmit antenna by multiplexing the outputs of the preconditioning for the selected subbands (step 526). Each preconditioned symbol stream is further processed (e.g., OFDM modulated) to provide a modulated signal for transmission from a respective transmit antenna (step 528).

For clarity, specific embodiments have been described above. Variations to these embodiments and other embodiments may also be derived based on the teachings described herein. For example, a set of subbands may be selected for use for data transmission based on one or more criteria, independent of the scheme used to allocate transmit power to the subbands. As another example, the gains D(k) and steering vectors may be derived by the receiver system and provided to the transmitter system as part of the CSI. The processing for MIMO and MIMO-OFDM systems is described in further detail in U.S. patent application Ser. No. 09/993,087, entitled "Multiple-Access Multiple-Input Multiple-Output (MIMO) Communication System," filed Nov. 6, 2001, assigned to the assignee of the present application and incorporated herein by reference.

For clarity, the techniques for performing beam-steering and beam-forming have been described specifically for a MIMO-OFDM system. These techniques may also be used for a MIMO system that does not employ OFDM. The processing to achieve beam-steering or beam-forming for each subband may be performed as described above. However, the processing by modulators 222 would be dependent on the particular modulation/transmission scheme selected for use.

The techniques described herein may be implemented by various means. For example, these techniques may be implemented in hardware, software, or a combination thereof. For a hardware implementation, the elements used to implement any one or a combination of the techniques (e.g., TX spatial processor 220) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in a memory unit (e.g., memory unit 232 in FIG. 2) and executed by a processor (e.g., controller 230). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for processing data for transmission via a wideband multiple-input channel, comprising:
   obtaining a steering vector for each of a plurality of subbands, wherein each steering vector includes a plurality of elements for a plurality of transmit antennas, and further wherein the steering vector is selectively configured to perform beam-forming or beam-steering using a beam-steering/forming unit; and
   preconditioning modulation symbols to be transmitted on each subband with the steering vector for the subband.

2. The method of claim 1, wherein each steering vector achieves beam-steering for the associated subband.

3. The method of claim 1, wherein the elements of each steering vector have equal amplitude.

4. The method of claim 1, wherein each steering vector achieves beam-forming for the associated subband.

5. The method of claim 1, further comprising:
   obtaining a plurality of scaling values for the plurality of subbands; and
   scaling the modulation symbols for each subband with the scaling value for the subband.

6. The method of claim 5, wherein the scaling values for the subbands are determined based on gains for the subbands provided by the steering vectors.

7. The method of claim 5, wherein the scaling values for the subbands are determined based on transmit powers allocated to the subbands.

8. The method of claim 7, wherein the transmit powers are allocated to the subbands based on full channel inversion.

9. The method of claim 7, wherein the transmit powers are allocated to the subbands based on selective channel inversion.

10. The method of claim 7, wherein the transmit powers are allocated to the subbands based on uniform power allocation.

11. The method of claim 7, wherein the transmit powers are allocated to the subbands based on water-filling power allocation.

12. The method of claim 1, wherein the multiple-input channel is a multiple-input multiple-output (MIMO) channel.

13. The method of claim 12, wherein the steering vector for each subband is derived based on an eigenvector corresponding to a principal eigenmode.

14. The method of claim 1, wherein the multiple-input channel is a multiple-input single-output (MISO) channel.

15. The method of claim 1, further comprising:
   coding and modulating data based on a common coding and modulation scheme to provide the modulation symbols.

16. The method of claim 1, further comprising:
   forming a stream of preconditioned symbols for each transmit antenna; and
   processing each stream of preconditioned symbols to provide a modulated signal for transmission from a respective transmit antenna.

17. The method of claim 1, wherein the wideband system implements orthogonal frequency division multiplexing (OFDM), and wherein the plurality of subbands correspond to orthogonal subbands provided by OFDM.

18. In a multiple-input communication system that implements orthogonal frequency division multiplexing (OFDM), a method for processing data for transmission via a multiple-input channel comprising:

obtaining a steering vector for each of a plurality of subbands, wherein each steering vector includes a plurality of elements for a plurality of transmit antennas, and further wherein the steering vector is selectively configured to perform beam-forming or beam-steering using a beam-steering/forming unit;

obtaining a plurality of scaling values for the plurality of subbands;

scaling modulation symbols to be transmitted on each subband with the scaling value for the subband;

preconditioning the scaled modulation symbols for each subband with the steering vector for the subband; and forming a stream of preconditioned symbols for each transmit antenna.

19. The method of claim 18, wherein each steering vector achieves beam-steering for the associated subband.

20. The method of claim 18, wherein the scaling values for the subbands are determined based on selective channel inversion.

21. A transmitter unit in a multiple-input communication system, comprising:

a TX data processor operative to code and modulate data based on one or more coding and modulation schemes to provide modulation symbols; and a TX spatial processor operative to obtain a steering vector for each of a plurality of subbands, precondition the modulation symbols to be transmitted on each subband with the steering vector for the subband, and provide preconditioned symbols for transmission via a single eigenmode of a multiple-input channel, and further wherein the steering vector is selectively configured to perform beam-forming or beam-steering using a beam-steering/forming unit.

22. The transmitter unit of claim 21, wherein the TX spatial processor is further operative to allocate total transmit power to the plurality of subbands.

23. The transmitter unit of claim 22, wherein the TX spatial processor is further operative to determine a scaling value for each subband based on the transmit power allocated to the subband, and to scale the modulation symbols for each subband with the scaling value for the subband.

24. The transmitter unit of claim 21, wherein each steering vector achieves beam-steering for the associated subband.

25. A transmitter unit in a multiple-input communication system that implements orthogonal frequency division multiplexing (OFDM), comprising:

a TX data processor operative to code and modulate data based on a common coding and modulation scheme to provide modulation symbols; and a TX spatial processor operative to obtain a steering vector for each of a plurality of subbands, wherein each steering vector includes a plurality of elements for a plurality of transmit antennas, and further wherein the steering vector is selectively configured to perform beam-forming or beam-steering using a beam-steering/forming unit, obtain a plurality of scaling values for the plurality of subbands, scale the modulation symbols to be transmitted on each subband with the scaling value for the subband, precondition the scaled modulation symbols for each subband with the steering vector for the subband, and provide preconditioned symbols for transmission via a single eigenmode of a multiple-input channel.

26. An apparatus operative to process data for transmission via a multiple-input channel, comprising:

means for obtaining a steering vector for each of a plurality of subbands, wherein each steering vector includes a plurality of elements for a plurality of transmit antennas, and further wherein the steering vector is selectively configured to perform beam-forming or beam-steering using a beam-steering/forming unit; and means for preconditioning modulation symbols to be transmitted on each subband with the steering vector for the subband.

27. The apparatus of claim 26, further comprising:

means for obtaining gains for the subbands provided by the steering vectors;

means for allocating total transmit power to the subbands based at least in part on the gains;

means for determining scaling values for the subbands based on transmit powers allocated to the subbands; and means for scaling the modulation symbols for each subband with the scaling value for the subband.

* * * * *